(12) United States Patent
Robinson et al.

(10) Patent No.: US 8,200,980 B1
(45) Date of Patent: Jun. 12, 2012

(54) SYSTEM AND METHOD FOR ENROLLING IN A BIOMETRIC SYSTEM

(75) Inventors: Timothy L. Robinson, Reston, VA (US); Bradford R. Schildt, Boulder, CO (US); Tennille V. Goff, Springfield, VA (US); Daniel J. Corwin, Ashburn, VA (US)

(73) Assignee: Open Invention Network, LLC, Durham, NC (US)

( * ) Notice: Subject to any disclaimer, the term of this patent is extended or adjusted under 35 U.S.C. 154(b) by 1141 days.

(21) Appl. No.: 10/861,864

(22) Filed: Jun. 7, 2004

Related U.S. Application Data

(63) Continuation-in-part of application No. 10/743,189, filed on Dec. 23, 2003, now Pat. No. 7,367,049, which is a continuation-in-part of application No. 10/678,646, filed on Oct. 6, 2003, which is a continuation-in-part of application No. 10/251,305, filed on Sep. 20, 2002, now Pat. No. 7,269,737.

(60) Provisional application No. 60/324,229, filed on Sep. 21, 2001.

(51) Int. Cl.
*G06F 21/00* (2006.01)
(52) U.S. Cl. ........................................................ 713/186
(58) Field of Classification Search .................. 713/186
See application file for complete search history.

(56) References Cited

U.S. PATENT DOCUMENTS

| | | |
|---|---|---|
| 4,230,214 A | 10/1980 | Cortez |
| 4,359,631 A | 11/1982 | Lockwood et al. |
| 4,553,222 A | 11/1985 | Kurland et al. |
| 4,716,593 A | 12/1987 | Hirai et al. |
| 4,879,747 A | 11/1989 | Leighton et al. |
| 4,915,205 A | 4/1990 | Reid et al. |
| 4,995,081 A | 2/1991 | Leighton et al. |
| 5,042,073 A | 8/1991 | Collot et al. |
| 5,086,389 A | 2/1992 | Hassett et al. |
| 5,144,553 A | 9/1992 | Hassett et al. |
| 5,274,695 A | 12/1993 | Green |
| 5,280,527 A | 1/1994 | Gullman et al. |
| 5,289,183 A | 2/1994 | Hassett et al. |
| 5,335,288 A | 8/1994 | Faulkner |
| 5,351,187 A | 9/1994 | Hassett |
| 5,352,876 A | 10/1994 | Watanabe et al. |
| 5,386,104 A | 1/1995 | Sime |
| 5,412,738 A | 5/1995 | Brunelli et al. |
| 5,450,980 A | 9/1995 | Laidlaw |
| 5,453,601 A | 9/1995 | Rosen |
| 5,455,407 A | 10/1995 | Rosen |
| 5,483,601 A | 1/1996 | Faulkner |
| 5,485,510 A | 1/1996 | Colbert |
| 5,523,551 A | 6/1996 | Scott |
| 5,546,523 A | 8/1996 | Gatto |
| 5,581,630 A | 12/1996 | Bonneau, Jr. |

(Continued)

OTHER PUBLICATIONS

MophoTouch™—Multi-Application Finger Identification in the Palm of Your Hand, Sagem Morpho, Inc., 1999.

(Continued)

*Primary Examiner* — Michael S McNally
(74) *Attorney, Agent, or Firm* — Williams Mullen

(57) ABSTRACT

A system and method for enrolling in a biometric authorization system. A system user may be authorized to enroll by providing biometric data from both his person and a third party token.

18 Claims, 4 Drawing Sheets

U.S. PATENT DOCUMENTS

| | | |
|---|---|---|
| 5,594,806 A | 1/1997 | Colbert |
| 5,598,474 A | 1/1997 | Johnson |
| 5,602,933 A | 2/1997 | Blackwell et al. |
| 5,613,012 A | 3/1997 | Hoffman et al. |
| 5,615,217 A | 3/1997 | Horne et al. |
| 5,615,277 A | 3/1997 | Hoffman |
| 5,657,389 A | 8/1997 | Houvener |
| 5,679,938 A | 10/1997 | Templeton et al. |
| 5,688,974 A | 11/1997 | Devine et al. |
| 5,696,739 A | 12/1997 | Chang |
| 5,719,950 A | 2/1998 | Osten et al. |
| 5,722,526 A | 3/1998 | Sharrard |
| 5,737,439 A | 4/1998 | Lapsley et al. |
| 5,745,598 A | 4/1998 | Shaw et al. |
| 5,751,973 A | 5/1998 | Hassett |
| 5,764,789 A | 6/1998 | Pare, Jr. et al. |
| 5,790,674 A | 8/1998 | Houvener et al. |
| 5,790,785 A | 8/1998 | Klug et al. |
| 5,799,092 A | 8/1998 | Kristol et al. |
| 5,802,199 A | 9/1998 | Pare, Jr. et al. |
| 5,805,082 A | 9/1998 | Hassett |
| 5,805,719 A | 9/1998 | Pare, Jr. et al. |
| 5,832,464 A | 11/1998 | Houvener et al. |
| 5,838,812 A | 11/1998 | Pare, Jr. et al. |
| 5,845,256 A | 12/1998 | Pescitelli et al. |
| 5,850,442 A | 12/1998 | Muftic |
| 5,857,079 A | 1/1999 | Claus et al. |
| 5,864,623 A | 1/1999 | Messina et al. |
| 5,870,723 A | 2/1999 | Pare, Jr. et al. |
| 5,872,834 A | 2/1999 | Teitelbaum |
| 5,893,075 A | 4/1999 | Plainfield et al. |
| 5,897,616 A | 4/1999 | Kanevsky et al. |
| 5,914,472 A | 6/1999 | Foladare et al. |
| 5,927,544 A | 7/1999 | Kanoh et al. |
| 5,930,804 A | 7/1999 | Yu et al. |
| 5,933,816 A | 8/1999 | Zeanah et al. |
| 5,943,423 A | 8/1999 | Muftic |
| 5,982,914 A | 11/1999 | Lee et al. |
| 5,984,366 A | 11/1999 | Priddy |
| 6,009,411 A | 12/1999 | Kepecs |
| 6,012,039 A | 1/2000 | Hoffman et al. |
| 6,018,739 A * | 1/2000 | McCoy et al. ................. 707/102 |
| 6,028,950 A | 2/2000 | Merjanian |
| 6,040,783 A | 3/2000 | Houvener et al. |
| D425,800 S | 5/2000 | Shin |
| 6,061,660 A | 5/2000 | Eggleston et al. |
| 6,070,141 A | 5/2000 | Houvener et al. |
| 6,070,147 A | 5/2000 | Harms et al. |
| 6,092,192 A | 7/2000 | Kanevsky et al. |
| 6,094,632 A | 7/2000 | Hattori |
| 6,105,010 A | 8/2000 | Musgrave |
| 6,119,932 A | 9/2000 | Maloney et al. |
| 6,125,192 A * | 9/2000 | Bjorn et al. ................... 382/124 |
| 6,148,091 A | 11/2000 | DiMaria |
| 6,149,055 A | 11/2000 | Gatto |
| 6,154,879 A | 11/2000 | Pare, Jr. et al. |
| 6,157,314 A | 12/2000 | Loftus |
| 6,160,903 A | 12/2000 | Hamid et al. |
| 6,161,059 A | 12/2000 | Tedesco et al. |
| 6,161,090 A | 12/2000 | Kanevsky et al. |
| 6,175,922 B1 | 1/2001 | Wang |
| 6,181,807 B1 | 1/2001 | Setlak et al. |
| 6,192,142 B1 | 2/2001 | Pare, Jr. et al. |
| 6,196,460 B1 | 3/2001 | Shin |
| 6,222,914 B1 | 4/2001 | McMullin |
| 6,230,148 B1 | 5/2001 | Pare, Jr. et al. |
| 6,233,564 B1 | 5/2001 | Schulze, Jr. |
| 6,246,751 B1 | 6/2001 | Bergl et al. |
| 6,256,737 B1 * | 7/2001 | Bianco et al. ................. 713/186 |
| 6,269,348 B1 | 7/2001 | Pare, Jr. et al. |
| 6,282,658 B2 | 8/2001 | French et al. |
| 6,307,955 B1 | 10/2001 | Zank et al. |
| 6,307,956 B1 | 10/2001 | Black |
| 6,310,966 B1 | 10/2001 | Dulude et al. |
| 6,314,169 B1 | 11/2001 | Schelberg, Jr. et al. |
| 6,317,723 B1 | 11/2001 | Walker et al. |
| 6,317,834 B1 | 11/2001 | Gennaro et al. |
| 6,321,339 B1 | 11/2001 | French et al. |
| 6,327,573 B1 | 12/2001 | Walker et al. |
| 6,330,543 B1 | 12/2001 | Kepecs |
| 6,332,134 B1 | 12/2001 | Foster |
| 6,334,109 B1 | 12/2001 | Kanevsky et al. |
| 6,334,112 B1 | 12/2001 | Walker et al. |
| 6,334,113 B1 | 12/2001 | Walker et al. |
| 6,341,169 B1 | 1/2002 | Cadorette, Jr. et al. |
| 6,345,263 B1 | 2/2002 | Matsumoto et al. |
| 6,363,485 B1 | 3/2002 | Adams et al. |
| 6,366,682 B1 | 4/2002 | Hoffman et al. |
| 6,370,649 B1 | 4/2002 | Angelo et al. |
| 6,381,344 B1 | 4/2002 | Smithies et al. |
| 6,389,401 B1 | 5/2002 | Kepecs |
| 6,397,126 B1 | 5/2002 | Nelson |
| 6,397,198 B1 | 5/2002 | Hoffman et al. |
| 6,405,125 B1 | 6/2002 | Ayed |
| 6,415,262 B1 | 7/2002 | Walker et al. |
| 6,422,464 B1 | 7/2002 | Terranova |
| 6,424,249 B1 | 7/2002 | Houvener |
| 6,433,818 B1 | 8/2002 | Steinberg et al. |
| 6,446,044 B1 | 9/2002 | Luth et al. |
| 6,463,127 B1 | 10/2002 | Maier et al. |
| 6,466,917 B1 | 10/2002 | Goyal et al. |
| 6,470,233 B1 | 10/2002 | Johnson, Jr. |
| 6,470,322 B1 | 10/2002 | Walker et al. |
| 6,477,509 B1 | 11/2002 | Hammons et al. |
| 6,496,595 B1 | 12/2002 | Pucheck et al. |
| 6,497,360 B1 | 12/2002 | Schulze |
| 6,498,970 B2 | 12/2002 | Colmenarez et al. |
| 6,507,912 B1 | 1/2003 | Matyas et al. |
| 6,522,772 B1 | 2/2003 | Morrison et al. |
| 6,523,741 B1 | 2/2003 | DiMaria et al. |
| 6,529,871 B1 | 3/2003 | Kanevsky et al. |
| 6,529,878 B2 | 3/2003 | De Rafael et al. |
| 6,532,459 B1 | 3/2003 | Berson |
| 6,539,282 B2 | 3/2003 | Metcalf et al. |
| 6,542,874 B1 | 4/2003 | Walker |
| 6,554,705 B1 | 4/2003 | Cumbers |
| 6,559,776 B2 | 5/2003 | Katz |
| 6,567,787 B1 | 5/2003 | Walker et al. |
| 6,581,042 B2 | 6/2003 | Pare et al. |
| 6,591,224 B1 | 7/2003 | Sullivan et al. |
| 6,594,376 B2 | 7/2003 | Hoffman et al. |
| 6,636,973 B1 | 10/2003 | Novoa et al. |
| 6,646,568 B2 | 11/2003 | MacPhail et al. |
| 6,647,372 B1 | 11/2003 | Brady et al. |
| 6,650,999 B1 | 11/2003 | Brust et al. |
| 6,651,063 B1 | 11/2003 | Vorobiev |
| 6,653,946 B1 | 11/2003 | Hassett |
| 6,655,585 B2 | 12/2003 | Shinn |
| 6,662,166 B2 | 12/2003 | Pare et al. |
| 6,685,088 B1 | 2/2004 | Royer et al. |
| 6,694,300 B1 | 2/2004 | Walker et al. |
| 6,695,206 B2 | 2/2004 | Ross |
| 6,715,673 B2 | 4/2004 | Fulcher et al. |
| 6,715,674 B2 | 4/2004 | Schneider et al. |
| 6,748,365 B2 | 6/2004 | Quinlan et al. |
| 6,755,344 B1 | 6/2004 | Mollett et al. |
| 6,758,394 B2 | 7/2004 | Maskatiya et al. |
| 6,792,334 B2 | 9/2004 | Metcalf et al. |
| 6,792,422 B1 | 9/2004 | Stride et al. |
| 6,796,492 B1 | 9/2004 | Gatto |
| 6,796,499 B1 | 9/2004 | Wang |
| 6,827,260 B2 | 12/2004 | Stoutenburg et al. |
| 6,854,642 B2 | 2/2005 | Metcalf et al. |
| 6,865,544 B1 | 3/2005 | Austin |
| 6,873,969 B2 | 3/2005 | Stone et al. |
| 6,886,742 B2 | 5/2005 | Stoutenburg et al. |
| 6,935,559 B2 | 8/2005 | Mollett et al. |
| 7,630,986 B1 | 12/2009 | Herz et al. |
| 2001/0000535 A1 | 4/2001 | Lapsley et al. |
| 2001/0011680 A1 | 8/2001 | Soltesz et al. |
| 2001/0025245 A1 | 9/2001 | Flickinger et al. |
| 2001/0034609 A1 | 10/2001 | Dovolis |
| 2001/0042022 A1 | 11/2001 | Kirkpatrick et al. |
| 2001/0047223 A1 | 11/2001 | Metcalf et al. |
| 2001/0047343 A1 | 11/2001 | Dahan et al. |
| 2002/0019811 A1 | 2/2002 | Lapsley et al. |
| 2002/0029196 A1 | 3/2002 | Metcalf et al. |

| | | | | | | |
|---|---|---|---|---|---|---|
| 2002/0030584 A1* | 3/2002 | Perler et al. ............... 340/5.53 | 2003/0130954 A1 | 7/2003 | Carr et al. | |
| 2002/0038165 A1 | 3/2002 | McHale, IV et al. | 2003/0144956 A1 | 7/2003 | Yu et al. | |
| 2002/0046121 A1 | 4/2002 | Walker et al. | 2003/0150907 A1 | 8/2003 | Metcalf et al. | |
| 2002/0062249 A1 | 5/2002 | Iannacci | 2003/0183689 A1 | 10/2003 | Swift et al. | |
| 2002/0077889 A1 | 6/2002 | Kolls | 2003/0187790 A1 | 10/2003 | Swift et al. | |
| 2002/0077890 A1 | 6/2002 | LaPointe et al. | 2003/0187796 A1 | 10/2003 | Swift et al. | |
| 2002/0077902 A1 | 6/2002 | Marcus | 2003/0191709 A1 | 10/2003 | Elston et al. | |
| 2002/0087413 A1 | 7/2002 | Mahaffy et al. | 2003/0209599 A1 | 11/2003 | Gatto | |
| 2002/0091537 A1 | 7/2002 | Algazi | 2003/0216967 A1 | 11/2003 | Williams | |
| 2002/0094111 A1 | 7/2002 | Pucheck et al. | 2003/0216987 A1 | 11/2003 | Mollett et al. | |
| 2002/0107965 A1* | 8/2002 | Piccionelli ............... 709/225 | 2003/0222135 A1 | 12/2003 | Stoutenburg et al. | |
| 2002/0111917 A1 | 8/2002 | Hoffman et al. | 2003/0229539 A1 | 12/2003 | Algiene | |
| 2002/0112177 A1* | 8/2002 | Voltmer et al. ............ 713/200 | 2003/0229540 A1 | 12/2003 | Algiene | |
| 2002/0116266 A1 | 8/2002 | Marshall | 2003/0229790 A1 | 12/2003 | Russell | |
| 2002/0128851 A1 | 9/2002 | Chefalas et al. | 2003/0236704 A1 | 12/2003 | Antonucci | |
| 2002/0147588 A1* | 10/2002 | Davis et al. ............... 704/246 | 2004/0012481 A1 | 1/2004 | Brusseaux | |
| 2002/0148892 A1 | 10/2002 | Bardwell | 2004/0020982 A1 | 2/2004 | Hoffman et al. | |
| 2002/0149467 A1* | 10/2002 | Calvesio et al. ........... 340/5.52 | 2004/0024672 A1 | 2/2004 | Brake et al. | |
| 2002/0153414 A1 | 10/2002 | Stoutenburg et al. | 2004/0039632 A1 | 2/2004 | Han et al. | |
| 2002/0154793 A1* | 10/2002 | Hillhouse et al. ........... 382/115 | 2004/0054587 A1 | 3/2004 | Dev et al. | |
| 2002/0161629 A1 | 10/2002 | Jentoft | 2004/0083172 A1 | 4/2004 | Wiederin | |
| 2002/0162031 A1 | 10/2002 | Levin et al. | 2004/0088232 A1 | 5/2004 | Minnis, Jr. | |
| 2002/0173986 A1 | 11/2002 | Lehew et al. | 2004/0088295 A1 | 5/2004 | Glazer et al. | |
| 2002/0178063 A1 | 11/2002 | Gravelle et al. | 2004/0143505 A1 | 7/2004 | Kovach | |
| 2002/0194128 A1 | 12/2002 | Maritzen et al. | 2004/0155101 A1 | 8/2004 | Royer et al. | |
| 2002/0196963 A1 | 12/2002 | Bardwell | 2004/0158524 A1 | 8/2004 | Anderson et al. | |
| 2003/0006277 A1* | 1/2003 | Maskatiya et al. ........... 235/379 | 2004/0192434 A1 | 9/2004 | Walker et al. | |
| 2003/0009382 A1 | 1/2003 | D'Arbeloff et al. | 2004/0201520 A1 | 10/2004 | Flick | |
| 2003/0009393 A1 | 1/2003 | Norris | 2004/0215565 A1 | 10/2004 | Huffman | |
| 2003/0018522 A1 | 1/2003 | Denimarck et al. | 2004/0254840 A1 | 12/2004 | Slemmer et al. | |
| 2003/0018567 A1 | 1/2003 | Flitcroft et al. | 2005/0010478 A1 | 1/2005 | Gravelle | |
| 2003/0034876 A1 | 2/2003 | Pucheck et al. | 2005/0055582 A1 | 3/2005 | Bazakos et al. | |
| 2003/0046228 A1 | 3/2003 | Berney | 2005/0144133 A1 | 6/2005 | Hoffman et al. | |
| 2003/0046542 A1* | 3/2003 | Chen et al. ............... 713/176 | 2005/0152598 A1* | 7/2005 | Birchbauer et al. ........ 382/170 |
| 2003/0055727 A1 | 3/2003 | Walker et al. | | | | |
| 2003/0067396 A1 | 4/2003 | Hassett | | | | |
| 2003/0075287 A1 | 4/2003 | Weik | | | | |
| 2003/0076417 A1 | 4/2003 | Thomas et al. | | | | |
| 2003/0090473 A1 | 5/2003 | Joshi | | | | |
| 2003/0105725 A1 | 6/2003 | Hoffman | | | | |
| 2003/0126448 A1* | 7/2003 | Russo ............... 713/186 | | | | |

OTHER PUBLICATIONS

Washington Post—For Dining in, Security Is the Order of the Day; Post 9/11 Concerns Thwarting Deliverymen: [Final Edition], 2004.

* cited by examiner

SYSTEM AND METHOD FOR ENROLLING IN A BIOMETRIC SYSTEM

This application is a continuation-in-part of application Ser. No. 10/743,189, filed Dec. 23, 2003, now U.S. Pat. No. 7,367,049 which is a continuation-in-part of application Ser. No. 10/678,646, filed Oct. 6, 2003, which is a continuation-in-part of application Ser. No. 10/251,305, filed Sep. 20, 2002, now U.S. Pat. No. 7,269,737 which claims domestic priority from provisional application No. 60/324,229, filed Sep. 21, 2001. Each above-identified application is incorporated by reference herein, in its entirety, for all purposes.

FIELD OF THE INVENTION

This application relates generally to a system and method of enrollment into a biometric authorization system. More particularly, the present invention relates to a system and method for utilizing registered biometric data to enroll in a biometric authorization system.

BACKGROUND OF THE INVENTION

Generally, systems that provide biometric authorization for verifying an individual's identity, verifying an individual's age, or authorizing a financial transaction require that a system user undergo an enrollment. In an enrollment, the individual typically presents identity verifying information, documents to attest to his true identity, and one or more biometric scans. After enrollment, a user is free to conduct transactions in the system. What is needed are systems and methods that increase the level of enrollment of users in a biometric authorization system.

SUMMARY OF THE INVENTION

The present invention addresses the aforementioned needs by providing a method of allowing individuals to enroll in a biometric authorization system by employing previously registered biometric data. The present invention provides a flexible process by which information registered in a third party system is employed to enroll an individual in a biometric authorization system.

DETAILED DESCRIPTION OF THE INVENTION

Figure 1:
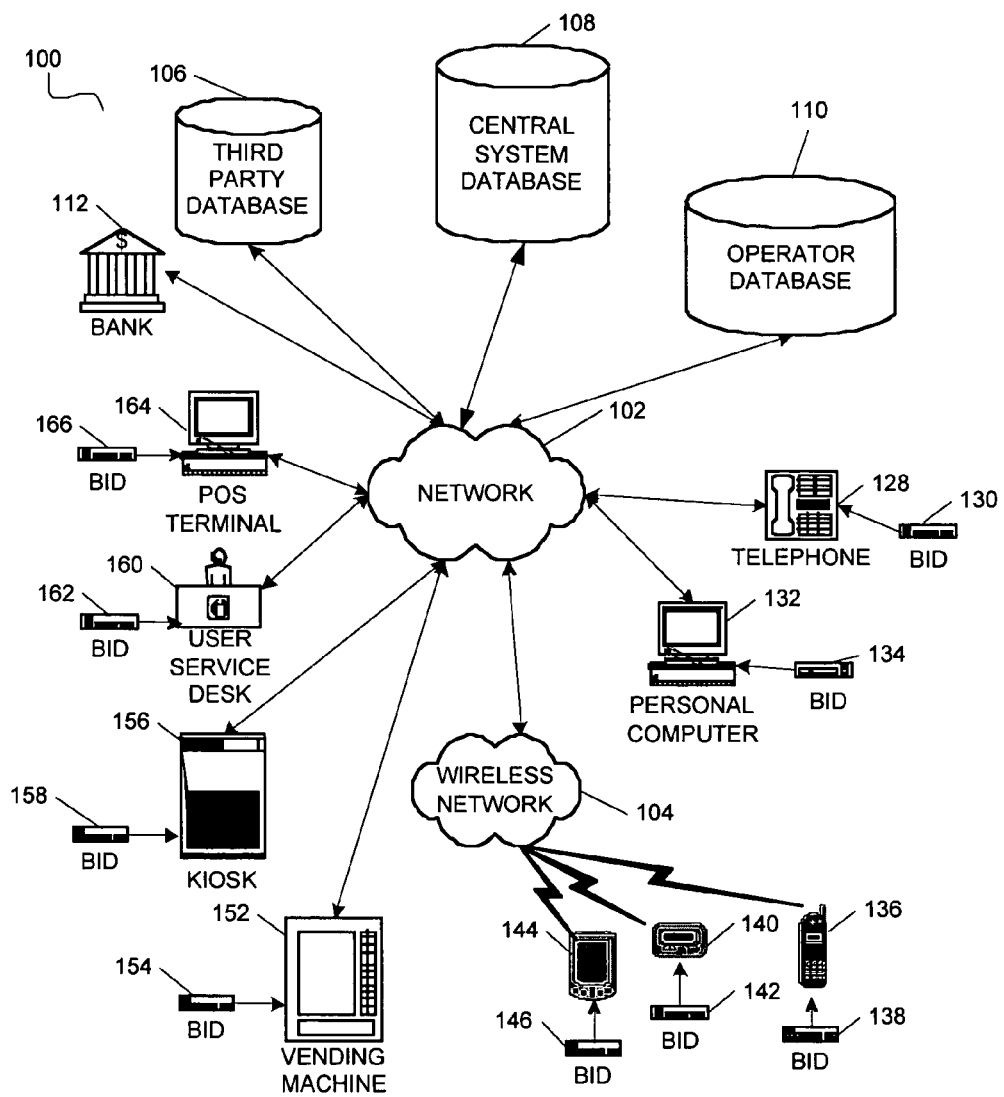
FIG. 1 illustrates an overview of the general architecture of a system for enrolling a system user in a biometric system according to an embodiment of the present invention.

Additional objects and advantages of the present invention will be apparent in the following detailed description read in conjunction with the accompanying drawing figures.

As previously noted, the present invention encompasses a system and method for enrolling user information into a system for verifying identity through tokenless or token-based biometric authorization. The disclosed enrollment method allows a user to utilize biometric information associated with a third party token to enroll in a biometric authorization system. The system may be configured to accept a variety of tokens linked with various forms of biometric information. In one scenario, the system acquires user biometric information that is stored on the token itself. For example, a driver's license may store fingerprint information in a magnetic stripe, a credit card may have an image of the user printed on its surface, or a smartcard may have a biometric template stored in an embedded chip. In another scenario, the system utilizes the token to locate biometric information archived at a third party location. For instance, a database for the Department of Motor Vehicles may have a user's fingerprint information on record and by presenting his driver's license, a user may authorize the system to access this information. Alternatively, the system may be configured to accept biometric information from more than one user token, thus further verifying the identity of the user by comparing user biometric information held on a multiple of tokens for user biometric verification.

The system user presents his token in conjunction with a scan of his biometric at an enrollment station. In one scenario, the system receives biometric data from one or more biometric tokens. In addition to the token biometric data, the user presents biometric data by means of a biometric input device. The biometric data can include a fingerprint scan, an iris scan, a facial scan, a voice scan, a retinal scan, hand architecture, a DNA sample, or any other physical measurement pertaining to a user's person.

The biometric data acquired by means of the token is compared to the biometric data received from the user. If the biometric data matches, the system user is enrolled in the system. The system then stores the biometric data in a user record to be employed at subsequent biometric authorizations. In general, the system may store the user biometric data, token biometric data, or the best biometric data provided. Alternatively, the system may be configured to combine received biometric data with token data and store this composite data. A biometric authorization generally refers to an authorization in which the user provides biometric data to be matched against a biometric record in a database. For example, a user may undergo biometric authorization to complete a financial transaction or to gain access to an age-restricted location. As would be appreciated, the location of the database as well as the specific mechanism by which the biometric data is matched to a particular biometric record would be implementation dependent and would not be limiting on the scope of the present invention. Thus, in a biometric authorization, the biometric data taken during the authorization can be matched against registered biometric data at a location where the registered biometric data is stored or where the authorization biometric data is gathered.

Additionally, the principles of the present invention are not limited to using one form of biometric. For example, the biometric data referred to throughout this description can represent a biometric image (or sample) and/or a mathematical representation of the biometric image, often referred to as a biometric "template". In one example, a biometric template can represent any data format that includes feature, positional, or other representing information of characteristics of biometric data. Alternatively, a template may be a mathematical representation of more than one biometric. For example, a user template may be generated from biometric data acquired from two individual fingers, such as a thumb and index finger, or from a finger and an iris scan.

In addition to biometric data, the user may provide the system with other information, such as name, address, phone number, email address, social security number, age information, identification number, government-issued identification number, financial account information, biometric token information and the like. This information may be hand-keyed into the system or may be acquired by other means, such as from the provided token or other documents, tokens, and vouchers. Additionally, user information may be acquired from a third party database. The information is stored in the user's record and may be employed at subsequent transactions as needed. The user record may be located at a database, on a token, or both.

FIG. 1 illustrates a general architecture overview of an identity verification system 100 that is based on biometric authorization. As will be described in greater detail below, an identity verification system 100 enables a flexible enrollment process by which users may enroll in the system. This registration information is stored in at least one system database 108, 110 where system user records are stored. In one embodiment, the system database is a central database to which all system user records are stored and from which system user records are accessed for identity verification. In another embodiment, the system database is one or more operator databases 110 to which a select set of system operator records are stored and from which a select set of system operator records are accessed for identity verification. In an additional embodiment, identity verification system 100 may also utilize a combination of central databases 108 and one or more operator databases 110. In general, embodiments utilizing a combination of system databases 108, 110 enable increased control of information flow throughout identity verification system 100. As described in greater detail below, various examples of information flow configurations within the system can include "open," "closed," and "multiple system operator" system models. In still further embodiments, system database 108, 110 can further comprise one or more sub databases that are contained within a particular system database 108, 110. In such embodiments, system user data, system operator data, and other system data may be distributed across multiple databases within the system database.

A system user record holds system user biometric information and other identity verifying information related to an individual seeking biometric recognition/verification so that the system user may be identified within the system. The information held in such a record may include, by way of illustration and without limitation, a system user's government identification number(s) and corresponding state(s) of issue, home address, and a telephone number and at least one biometric record. A system user may present any number of identity verifying documents or testaments to his identity depending on the embodiment of the biometric system. By way of illustration and not of limitation, examples of such documents or testaments include a financial token, a digital image, a video clip, family information, or a DNA sample. Depending on the particular implementation, a system user record can also hold financial account information and/or a system identification number (SID). An SID is a code used in conjunction with a system user biometric scan for biometric recognition/verification.

Additionally, system user records are marked according to various states of activity in a biometric authorization system. Such states may include but are not limited to pre-active, active, and negative. Pre-active system user records include those where a system user record has been created and the record has not been enabled. Active system user enrollment records include those where a system user record has been created and is enabled for use. Negative system user records include those where a system user record has been created but fraud regarding information presented for storage or stored in that record has been detected. After a system user record includes enabling enrollment information, the system user record is marked active, and a history of the record's activity is stored in the system user record. In an additional embodiment, system user records that are enabled and are marked active are also marked as verified or unverified. Verified records are those that have been reviewed and verified by at least one system operator, third party, and/or third party database. Unverified records are those that contain the necessary enrollment data needed to enable their respective system users to identify their identities in the system but that have not been verified.

The system also comprises system operator records that hold information useful for authenticating an operator, such as a name or ID number, device ID numbers associated with the operator, an address, and a phone number. In an alternate embodiment of the present invention, the operator records also hold employer information if the operator is an employee of an employer who is also an operator. In another embodiment of the present invention, operator records hold an operator SID and/or an operator biometric scan.

The system may be configured so that at least one system database 108, 110 is connected to at least one network 102, such as but not limited to, the Internet. This network comprises connections to at least one enrollment station where a system user may enter enrollment information. Enrollment stations are composed of at least one enrollment device and the necessary means for sending and receiving information to and from a system user and to and from a system database. These stations include but are not limited to a vending machine 152, a kiosk 156, a personal computer 132, a user service desk 160, a point of sale terminal 164, or a wireless device 136, 140, 144, connected via wireless network 104, with respective biometric input devices (BIDs) 154, 158, 134, 162, 166, 138, 142, and 146. BID devices are illustrated in FIG. 1 as peripheral devices for purposes of emphasis only. The system should not be so limited and may certainly incorporate devices with integrated BIDs.

Networks used in additional embodiments include LANs (local area networks), WANs (wide area networks), and telephone networks. In one example, system users communicate with at least one system database 108, 110 via telephone 128, with a connected BID device 130.

Additional embodiments of the system also comprise connections to one or more third party sources, such as a third party database 106 and/or one or more financial institutions 112, in which system user-presented information is verified and/or from which system user information is pulled.

In one embodiment, the system is configured as an "open" system, meaning all information entered into the system is transmitted to and stored in a centralized system database 108. An open system allows enrollment at any enrollment station in the system because an open system shares system user information stored in the centralized system database 108 with all stations.

In an alternate embodiment, the system is configured as a "closed" system, meaning information entered into the system via a specific operator device is transmitted to and stored in a system database specific to that operator 110, and this information is not shared with other enrollment stations or other system databases. This is referred to as a "closed" system because system users who enrolled in one system operator's database 110 must enroll in the database of each additional system operator system wherein they would like to enroll their information. Operator system databases 110 in closed systems may query other databases, such as a third party information database 118. However, all system user information that is enrolled into a particular operator system database 110 is stored in that database. In an alternate embodiment of the closed system, information pertaining to specific system operators is stored in a partitioned, central system database 108. System operator related information is stored in system, operator-specific partitions and is closed to all other system operators. Only the system operator, system operator employees, and authorized entities may access that partition of the central system database 108. In yet an additional embodiment, system operator related information stored in an operator system database is additionally stored on the central system database 108 where their system users' records are stored. Such an embodiment is useful for information protection in the event database information is lost.

In a further embodiment of the present invention, system user information is "selectively shared" and stored in select system multiple-operator databases or select, system multiple-operator partitions within the central system database 108. In this embodiment, a group of system operators share data with each other and they choose whether or not to share system information with other system operators within the system. Such a system is referred to as a "selectively shared" system. This system allows a chain of system operators owned by the same entity or linked in some other manner to share system user information amongst them without sharing that information with all other non-designated system operators registered in the system. Information in such a system may be shared between one or more operator system databases 110 and the central system database 108 freely or sharing may be monitored by rules set in the operator system databases 110, the central system database 108, or both. By way of illustration and not as a limitation, one system operator might only want to share system user transaction information with one of five system operators in a multi-verifier system or all system operators might not want to send or store system user transaction information to the central system database 108. Such a system allows system operators greater control over information flow while still allowing various user conveniences, such as being able to enroll at any store in a selectively shared chain.

The configuration of the system as an "open" system, "closed" system, or "selectively shared" system illustrates various ways of implementing the principles of the present invention. System configuration might be determined by the system in which the enrollment information is used. For example, a merchant who is an operator in the system and who conducts biometrically authorized customer loyalty programs might have a system configured with his own operator system database 110 and one or two biometric authorization terminals connected to that database. In this system configuration, the merchant's database files only exist on his database 110 and are retrieved or accessed for biometric matching only by the one or two pre-determined stations connected to the database 110; therefore, the system would be a "closed" system.

Figure 2:
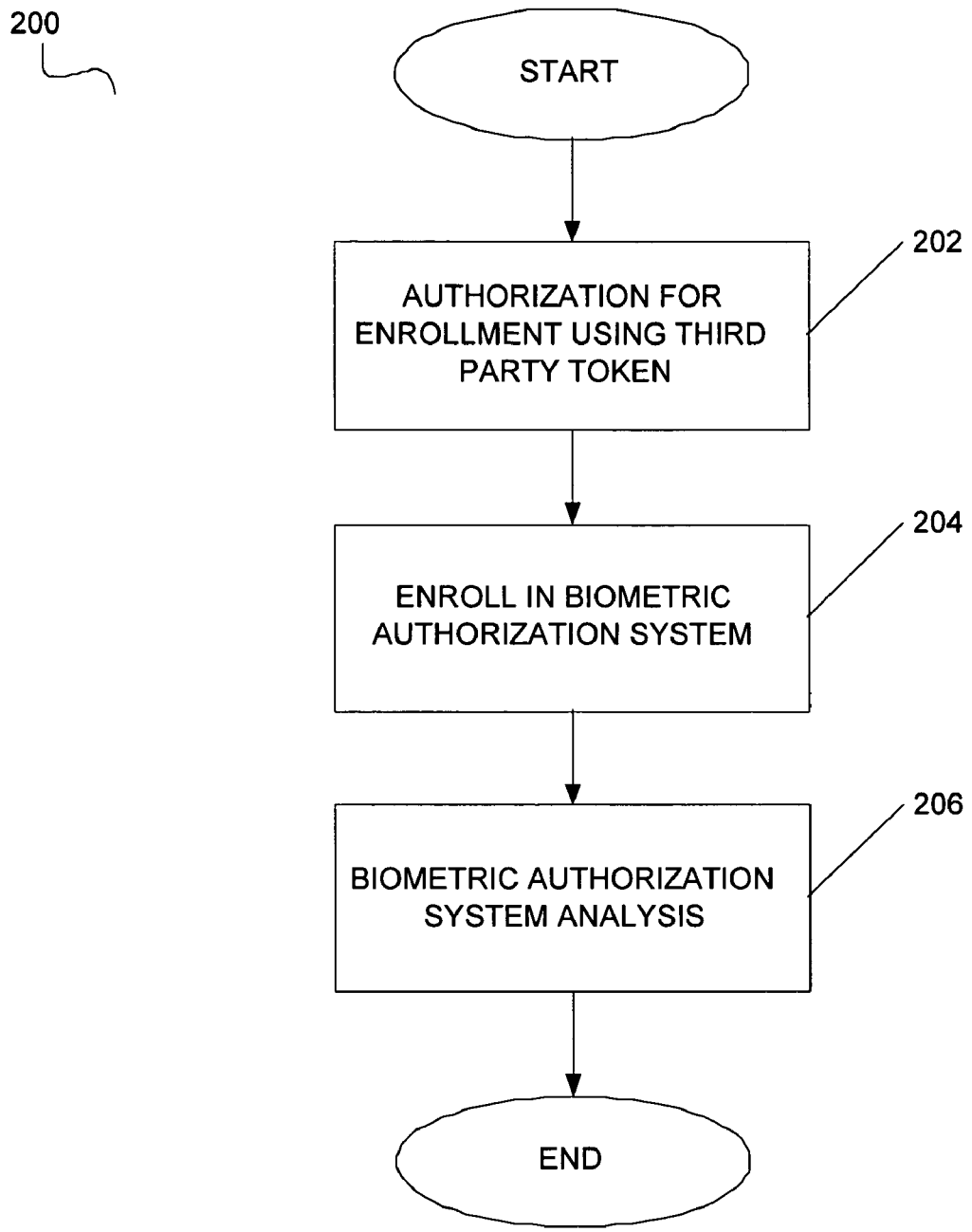
FIG. 2 illustrates a flowchart of a process for enrollment in a biometric authorization system by utilizing previously registered biometric data.

FIG. 2 illustrates a flowchart of an enrollment process in a biometric authorization system that utilizes previously registered biometric data. At step 202, a user is authorized for enrollment by the use of one or more third party biometric tokens. This authorization may occur in several ways. In one embodiment, the user presents one or more biometric tokens along with a biometric scan to an enrollment station where the user biometric data is compared to the token biometric data. The system may acquire biometric data stored upon the token in numerous ways, such as, but not limited to, a magnetic stripe, a barcode, an embedded chip, or an image imprinted on the token's surface or embedded within the token. Alternatively, biometric data may be located in a third party database 106 to which the token provides access. The user and/or the token may indicate which third party database 106 to be accessed. In one scenario, the user has preauthorized the third party to permit other biometric systems to access all or part of his user record. For example, a user registered at a Department of Motor Vehicles may have noted on his registration form that other systems may have access to his biometric, address, age information, and other such data.

If the token biometric data matches the user biometric data, the user is authorized for enrollment. For example, a user employing a smartcard with fingerprint data stored in an embedded chip places his token in the card reader and places his finger upon a biometric input device. If the biometric data acquired from the token matches the data retrieved from the fingerprint scan, the user is authorized to enroll.

In another embodiment, the user may be required to authorize his identity by presenting one or more biometric tokens along with a biometric scan to a verification system independent from the enrollment station. This independent verification may be completed at a service device or may be supervised by a system operator. Additionally, the independent verification may be recorded for review at a later time. The user would present a biometric token along with a biometric scan, and if the acquired biometric data matches, the user would be authorized to enroll. For example, a user may present his biometric token and a biometric scan to an attendant at a convenience store. This presentation may be performed in conjunction with other transactions, such as a purchase transaction. The attendant could then employ an independent system device to perform a biometric identification check on the user. If the user is successfully identified, the attendant and/or the device may inform the user that he may enroll in the biometric authorization system. In one embodiment, the independent verification device may transmit a signal to the enrollment station acknowledging that the user is permitted to enroll in the biometric authorization system.

At step 204, the user enrolls in the biometric system. Due to the initial identity verification provided at step 202, this enrollment process can be performed without supervision by an attendant. If the user has already provided biometric information at the enrollment station, that biometric information can be stored in a user record to be employed upon subsequent biometric authorizations. If the user's third party biometric token was authorized at an independent device, the user presents his biometric at the enrollment station. Once acquired, the biometric information is stored in a user record to be used at later biometric authorizations. The system may be configured to register the token biometric data, the received biometric data or all biometric data acquired. In one embodiment, the system may be configured to evaluate the token biometric data and the received biometric data and enroll the superior data. Alternatively, the system may store composite biometric data generated from the token biometric data and the received biometric data.

In addition to biometric data, the user may provide other information, such as name, address, phone number, financial information and the like. This information may be hand-keyed into the system or may be acquired by other means. In one scenario, user information is acquired by means of the token employed for user authorization at step 202. The system may access information stored on the token or the token may indicate and provide access to a third party database housing user data. Additionally, the system may acquire user information from other sources. Other possible sources are additional tokens, such as credit cards or identification documents. Another possible source may be a paper check with magnetic ink readable by a Magnetic Ink Character Recognition (MICR) device attached to the enrollment station. The system may be configured to acquire user information from one or more documents, tokens, and/or vouchers via magnetic stripes, barcodes, digital scan, Optical Character Recognition (OCR), an embedded data chip, radio frequency identification (RFID) and the like.

At step 206, the biometric authorization system analyzes the enrollment biometric data and user information to determine the reliability of the data and the authenticity of the user. This verification may be completed by an automatic process of the system, a third party system, and/or a system operator. Depending on the system configuration, the enrollment biometric data may be verified instantly granting the user access, conditionally verified allowing a user limited access, or the user may be prohibited from employing the enrolled biometric data until it has been verified. For example, a user may enroll in the system by utilizing a biometric check card from an obscure bank. Because the token biometric data utilized at enrollment is from an unfamiliar source, the user may be required to supply a photo ID in conjunction with his biometric when accessing the biometric authorization system for the first time. This may serve as verification and allow the user full access in the system for subsequent transactions.

Figure 3:
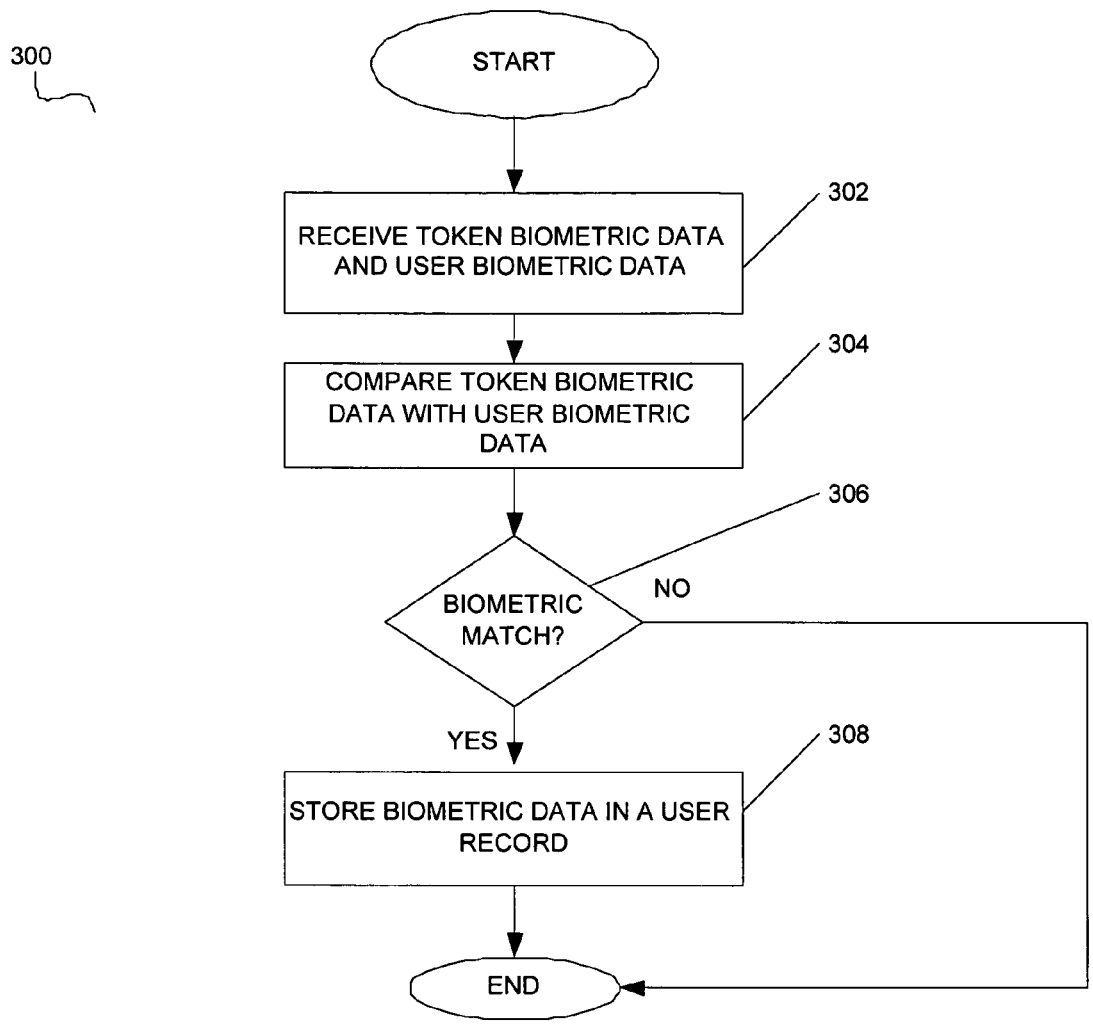
FIG. 3 illustrates a flowchart of a process for self-contained enrollment in a biometric authorization system.

FIG. 3 illustrates an embodiment of a self-contained method for enrollment in a biometric authorization system. At step 302, the system receives token biometric data and biometric data received from the user at an enrollment station. The system user presents one or more biometric tokens in conjunction with a live scan of his biometric at the enrollment station. For example, the user may swipe his driver's license through a magnetic stripe reader and then place his finger upon a fingerprint sensor. In another example, the user performs an iris scan and then supplies an identification card with bar-coded biometric data. If the user token does not house biometric information, the system accesses the biometric data from a third party database indicated by the token.

In addition to biometric data, the user may provide other information, such as name, address, phone number, financial information and the like. This information may be hand-keyed into the system or may be acquired by other means. The system may acquire further user information from the biometric token previously employed. The information may be stored on the token or the token may indicate and provide access to a third party database housing user data. Additionally, the system may acquire user information from other sources, such as other tokens, documents and/or vouchers via magnetic stripes, barcodes, digital scan, MICR, OCR, an embedded data chip, a RFID and the like.

At step 304, the system compares the biometric data received from the user with the biometric data acquired via the token. If the biometric data matches sufficiently to meet system requirements, the user is enrolled in the biometric authorization system. The comparison of the data may transpire at a variety of locations. In one embodiment, the biometric data is compared at the enrollment device. In this localized matching system, the system acquires the user's biometric scan and retrieves the token biometric data, either from the token itself or an associated third party database 106, and compares the biometric data at the local device. If the biometric data matches, the user's information, including biometric data, is transmitted to a database 108, 110 for storage. Alternatively, the system may be configured for centralized matching. In a centralized matching system, after the system receives the user's biometric scan data and the token biometric data, the data is transmitted to a database 108, 110 for comparison. If the biometric data matches, biometric data is stored in a user record at the database 108, 110. Alternatively, if a third party database 106 houses the token biometric data, the token biometric data is retrieved from the third party database 106 and then transmitted to a system database 108, 110 along with the scanned biometric data for comparison. In another scenario, the scanned biometric data is sent to the third party database 106 in conjunction with a token indicator, and the biometrics are matched at the third party database 106. This may be necessary if the third party does not permit retrieval of biometric data stored within its records.

At step 308, the system stores the biometric data and user information in a user record to be employed at subsequent biometric authorizations. The system may store the user biometric data, token biometric data, all the biometric data provided, or the biometric data deemed the most beneficial. Alternatively, the system may be configured to combine scanned biometric data with token data and store this composite data.

As noted, the principles of the present invention can be used for verifying identity through tokenless or token-based biometric authorization. In one embodiment, the user record that is stored at step 308 is also stored on a new token that can be issued to the user. This newly-issued token, which represents a form of token conversion based on the third-party token, can form the basis for future transactions. More generally, it is a feature of the present invention that a first token of a given level of reliability and security can be used to generate a second token or other biometric enrollment.

Figure 4:
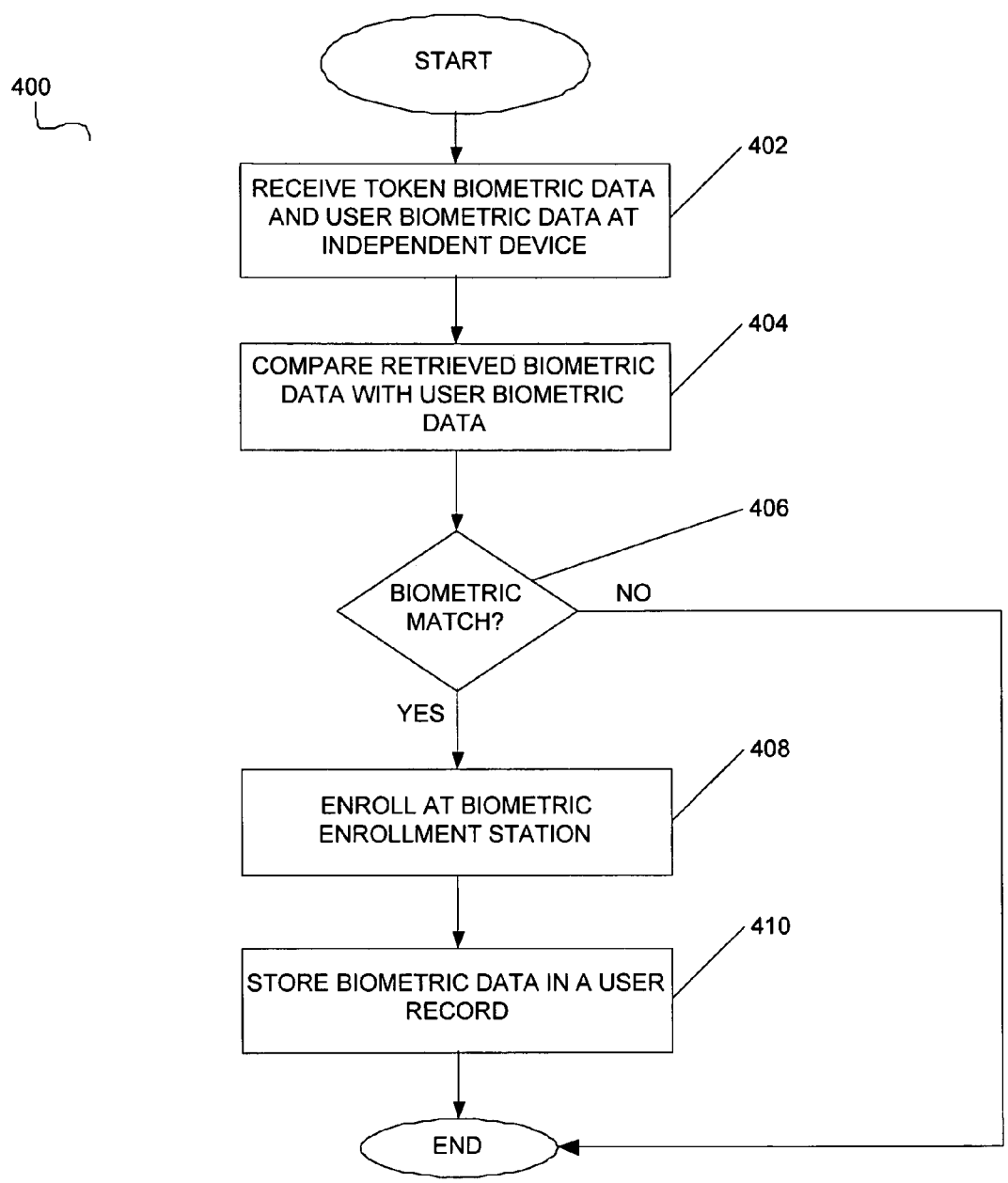
FIG. 4 illustrates a flowchart of a process for distributed enrollment in a biometric authorization system.

FIG. 4 illustrates a distributed method for enrollment in a biometric authorization system. This distributed method can apply to those instances where independent devices would exist at the enrollment location. At step 402, the system user presents one or more biometric tokens in conjunction with a scan of his biometric at an independent device. If the user token does not house biometric information, the device accesses the biometric data from a third party database 106 indicated by the token.

At step 404, the system compares the biometric data received from the user with the token biometric data. The comparison of the biometric data may transpire at a variety of locations. In one embodiment, the biometric data is locally compared at the independent device. Here, the system acquires the user's biometric scan and retrieves the token biometric data, either from the token itself or a third party database 106 and compares the data at the device. Alternatively, in a centralized matching system, after the system receives the scanned biometric data and the token biometric data, the data is transmitted to a database 108, 110 for comparison. In a further embodiment, if a third party database 106 houses the token biometric data, the token biometric data is retrieved from the third party database 106 and then transmitted to an independent authorization system along with the scanned biometric data for comparison. In yet another embodiment, the scanned biometric data is sent to the third party database 106 in conjunction with the token indicator, and the biometrics are matched at the third party database 106. This may be necessary if the third party does not permit retrieval of biometric data stored within its records.

At step 406, if the biometric data matches sufficiently to meet a system requirement, the user is authorized to enroll in the biometric authorization system. In one embodiment, the independent device transmits a signal to the enrollment station acknowledging that the user has been authorized. Alternatively, the device may be utilized by a system operator who permits the user to enroll upon a successful authorization.

Once the user has been authorized, he may enroll at step 408. At an enrollment station, the user presents his biometric data by means of a biometric input device. The system may also receive biometric data from one or more biometric tokens. In addition to biometric data, the user may provide other information, such as name, address, phone number, financial information and the like. This information may be hand-keyed into the system or may be acquired by other means, such as from the provided token or other documents, tokens and vouchers. The system may be configured to acquire user information from a document, token, or voucher via magnetic stripes, barcodes, digital scan, MICR, OCR, an embedded data chip, a RFID and the like.

At step 410, the system stores the biometric data and user information in a user record to be employed at subsequent biometric authorizations. The system may store the user biometric data, token biometric data, all the biometric data provided, or the biometric data deemed the most beneficial. Alternatively, the system may be configured to combine received biometric data with token data. Again, in one embodiment, the biometric data and user information can also be stored in a token and issued to the user.

As aforementioned, after the user has enrolled in a biometric authorization system, the system may analyze enrolled biometric data and user information in order to determine the reliability of the data and the authenticity of the user. In order to ensure that a biometric token utilized for enrollment authorization is from a reputable source, the system may be configured to evaluate the supplied token. The evaluation may be based upon one or more a biometric token source, a biometric token type, a biometric token certification, a biometric token generation process, a biometric token generation date, a biometric token generation time, a biometric token generation location, and a biometric token generation supervising attendant. Tokens may be assigned a rating corresponding with the integrity of this information. For example, tokens of a trustworthy origin, such as government-issued documents, may be rated highly and accepted without further scrutiny. However, if the biometric token is from an ambiguous source, such as an employee identification card, enrollment may be declined or the user may be required to provide further information to complete enrollment. This information may be entered immediately at the enrollment station or during a subsequent transaction in the biometric authorization system. For example, a user may employ a biometric employee ID card to enroll in the system. The system may not recognize the source of this biometric token and require the user supply driver's license information to continue enrollment. This information may be acquired by swiping the license through a card reader at the enrollment station. If the enrollment station is not equipped with such a reader or if the user does not have his license, he may have limited access to the system until the verification is complete. The user may be required to present his driver's license to a system operator when first employing the biometric authorization system. Once the required information has been registered in the user record, full access may be granted. Alternatively, enrollment verification may be completed by a third party system linked to the biometric authorization system.

In an additional embodiment, a system operator may verify the user to complete enrollment. If a biometric token utilized for enrollment is deemed ambiguous, a system operator may be notified and requested to provide verification. For example, at an enrollment station, a user may present a biometric token with a low integrity rating. The system may then transmit a signal to a system operator device notifying him of the situation. If the system operator is located at the same location as the enrollment station or overseeing the enrollment process from a remote location, the operator may acquire more identity verification information from the user. If the system operator deems the enrolling user is acceptable, he may notify the system, either at the enrollment station or at a separate system device. Alternatively, if the system operator is not accessible from the enrollment site, the user may be granted limited system access until a system operator has reviewed his enrollment information. If the system operator deems that more information is needed to verify the user, the user may be prompted to provide more verification information upon subsequent system use. For example, the user may be required to answer a security question upon his initial transaction in the system. The correct answer would remove the restriction and grant the user system access at future transactions.

In an additional embodiment, the enrollment process may be recorded to ensure security. An enrollment station may be equipped with a recording device, such as, but not limited to, a video or digital camera. The recorded enrollment process may then be employed to verify the user and/or the system operator and aid in the prevention of fraudulent use. Additionally, the recorded enrollment may be compared to an image stored at a database to authenticate the user. Alternatively, the camera may provide a live video feed to a security service.

A system and method for enrolling in a biometric authorization system has been illustrated. It will be appreciated by those skilled in the art that the system and method of the present invention can be used to perform enrollments in a biometric system. It will thus be appreciated by those skilled in the art that other variations of the present invention will be possible without departing from the scope of the invention disclosed.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention. Therefore, the above description should not be considered to be exclusive of these other embodiments. Also, it is to be understood that the phraseology and terminology employed herein are for the purposes of description and should not be regarded as limiting.

What is claimed is:

1. A method for enrolling a user in a biometric authorization system, the method comprising:
   receiving, from a first biometric input device enabled to acquire biometric data stored on a token, a token biometric sample;
   receiving, from a second biometric input device enabled to acquire biometric data via a live biometric scan of an individual, a live biometric sample;
   comparing said received token biometric sample with said received live biometric sample;
   in response to said received live biometric sample matching said received token biometric sample, storing a new biometric sample, the new biometric sample being a composite of said received live biometric sample and said received token biometric sample in a user record for subsequent authorization determinations in said biometric authorization system, wherein the new biometric sample comprises at least a portion of the received live biometric data and at least a portion of the received token biometric data;
   associating with the user record an integrity rating, said integrity rating indicating an evaluated integrity of the token, wherein the evaluated integrity of the token is based on a token source, a token generation process, and a token generation location; and granting the user a level of access to the biometric authorization system based upon the associating of the user record with the integrity rating.

2. The method of claim 1, further comprising receiving a user identification code.

3. The method of claim 1, wherein said biometric data is one or more of a fingerprint, an iris scan, a facial scan, a voice scan, a retinal scan, a hand architecture, and a DNA sample.

4. The method of claim 1, further comprising authorizing a request for a financial transaction.

5. The method of claim 1, further comprising authorizing a request for an age-verification transaction.

6. The method of claim 1, further comprising authorizing a request for an identity verification transaction.

7. The method of claim 1, wherein said user record is located at one or more of a database and a token.

8. The method of claim 1, further comprising receiving additional information from one or more of a biometric token, magnetic ink character recognition data reader, a barcode reader, a digital scanner, a manual input device, a radio frequency identification device, an embedded data chip reader, a magnetic stripe reader, optical character recognition device and a database.

9. The method of claim 1, further comprising receiving additional information including one or more of a user name, a user address, a user phone number, a user email address, a user social security number, user age information, a user identification number, a government-issued identification number, user financial account information, and biometric token information.

10. The method of claim 9, further comprising storing at least part of said additional information in said user record.

11. The method of claim 1, further comprising storing a recording of one or more of said user, a system operator, and an enrollment event.

12. The method of claim 11, wherein said recording includes one or more of an image and a video recording.

13. The method of claim 12, further comprising comparing said image to a registered image.

14. The method of claim 13, wherein said registered image is retrieved from a database.

15. The method of claim 1, further comprising receiving a live video transmission of said enrolling.

16. The method of claim 1, further comprising limiting user access to said biometric authorization system until said received token biometric sample is evaluated by one or more of an automated system process, a third party, and a system operator.

17. The method of claim 16, wherein said system operator is at a remote location.

18. The method of claim 1, wherein said comparing is performed at one or more of a local biometric device and a database.

* * * * *